US010199665B2

United States Patent
Hilmi et al.

(10) Patent No.: US 10,199,665 B2
(45) Date of Patent: Feb. 5, 2019

(54) FUEL CELL MATRIX COMPOSITION AND METHOD OF MANUFACTURING SAME

(71) Applicant: FuelCell Energy, Inc., Danbury, CT (US)

(72) Inventors: Abdelkader Hilmi, Bethel, CT (US); Arun Surendranath, Danbury, CT (US); Chao-Yi Yuh, New Milford, CT (US); Mohammad Farooque, Marlboro, NJ (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 15/628,047

(22) Filed: Jun. 20, 2017

(65) Prior Publication Data

US 2017/0288238 A1    Oct. 5, 2017

Related U.S. Application Data

(62) Division of application No. 14/164,817, filed on Jan. 27, 2014, now abandoned.

(51) Int. Cl.
*H01M 8/14*         (2006.01)
*H01M 8/0295*    (2016.01)

(52) U.S. Cl.
CPC ......... *H01M 8/0295* (2013.01); *H01M 8/145* (2013.01); *H01M 2008/147* (2013.01); *Y02E 60/526* (2013.01); *Y02P 70/56* (2015.11)

(58) Field of Classification Search
CPC . H01M 8/144; H01M 8/146; H01M 2008/147
See application file for complete search history.

(56) References Cited

U.S. PATENT DOCUMENTS

| | | | |
|---|---|---|---|
| 4,410,607 A | * | 10/1983 | Arons ...................... C01B 4/00 29/623.1 |
| 5,580,673 A | * | 12/1996 | Farooque ............ H01M 8/0295 29/623.5 |
| 5,869,203 A | | 2/1999 | Huang et al. |
| 7,353,085 B2 | | 4/2008 | Rusta-Sallehy et al. |
| 7,678,470 B2 | | 3/2010 | Yoon et al. |
| 7,790,327 B2 | | 9/2010 | Ham et al. |
| 2004/0062981 A1 | | 4/2004 | Friedrich |
| 2005/0112425 A1 | | 5/2005 | Hsu |

(Continued)

FOREIGN PATENT DOCUMENTS

| CN | 101443942 A | 5/2009 |
|---|---|---|
| JP | 05-238814 A | 9/1993 |

(Continued)

OTHER PUBLICATIONS

Lee, Insung et al., Influence of Aluminum Salt Addition on In Situ Sintering of Electrolyte Matrices for Molten Carbonate Fuel Cells; J. Power Sources 101 (2001), pp. 90-95.

(Continued)

*Primary Examiner* — Stephen J Yanchuk
(74) *Attorney, Agent, or Firm* — Foley & Lardner LLP

(57) ABSTRACT

A composition for use in forming a fuel cell matrix includes a support material, an electrolyte material, and an additive material that includes a plurality of flakes having an average length in a range of 5 to 40 micrometers and an average thickness of less than 1 micrometer.

16 Claims, 14 Drawing Sheets

(56) References Cited

U.S. PATENT DOCUMENTS

2006/0257721 A1    11/2006    Xu et al.
2008/0032183 A1     2/2008    Xu et al.
2011/0287333 A1    11/2011    Shin et al.

FOREIGN PATENT DOCUMENTS

| JP | 2010-233222 A | | 9/1998 |
| JP | 2012-506612 A | | 3/2012 |
| KR | 1020100047703 | | 5/2010 |
| WO | WO98/26465 | * | 12/1996 |
| WO | WO-2006/124449 A2 | | 11/2006 |

OTHER PUBLICATIONS

Lee, Jong-Jin Lee, et al., Characteristics of Aluminum-Reinforced y-LiAlO2 Matrices for Molten Carbonate Fuel Cells; J. Power Sources 179 (2008), pp. 504-510.

First Office Action in CN Pat. Appl. No. 201580006119.2 dated Apr. 2, 2018, with English translation (11 pages).

Extended European Search Report for EP15740683.6 dated Aug. 10, 2017 (8 pages).

International Preliminary Report on Patentability received for PCT/US2015/012922(14 pages) dated Aug. 11, 2016.

International Preliminary Report on Patentability received for PCT/US2015/013837, dated Aug. 11, 2016 (12 pages).

Kim, Hyungsuk et al., 'Enhancement of mechanical strength using nano aluminum reinforced matrix for molten carbonate fuel cell', Transactions of the Korean Hydrogen and New Energy Society, 2012, vol. 23, Issue 2, pp. 143-149.

Lee I et al, "Influence of aluminum salt addition on in situ sintering of electrolyte matrices for molten carbonate fuel cells" Journal of Power Sources, Elsevier SA, CH, vol. 101, No. I, Oct. 1, 2000, pp. 90-95.

Office Action issued in KR 10-2016-7022909 dated Oct. 30, 2016, with English translation (15 pages).

Notice of Allowance on U.S. Appl. No. 15/173,590 dated Jul. 12, 2018 (7 pages).

* cited by examiner

FUEL CELL MATRIX COMPOSITION AND METHOD OF MANUFACTURING SAME

CROSS REFERENCE TO RELATED APPLICATIONS

This application is a Divisional of U.S. application Ser. No. 14/164,817, filed Jan. 27, 2014, which is incorporated herein by reference in its entirety.

BACKGROUND OF THE INVENTION

This invention relates to fuel cells and, in particular, to a fuel cell matrix and a method of making the fuel cell matrix for use in Molten Carbonate Fuel Cells ("MCFCs").

A fuel cell is a device which directly converts chemical energy stored in hydrocarbon fuel into electrical energy by an electrochemical reaction. Generally, a fuel cell comprises an anode and a cathode separated by an electrolyte, which conducts charged ions. In order to produce sufficient power, individual fuel cells are stacked in series with an electrically conductive separator plate between each cell.

MCFCs generally operate at intermediate temperatures of from 575° C. to 650° C. using fuel containing carbon dioxide and carbon monoxide. A conventional fuel cell assembly includes a porous nickel anode and a porous lithiated nickel oxide cathode, separated by an electrolyte matrix storing carbonate electrolyte, such as mixtures of lithium carbonate/potassium carbonate ($Li_2CO_3/K_2CO_3$) or lithium carbonate/sodium carbonate ($Li_2CO_3/Na_2CO_3$). MCFCs generate power by passing a reactant fuel gas through the anode, while oxidizing gas is passed through the cathode. The anode and the cathode of MCFCs are isolated from one another by the porous ceramic matrix which is saturated with carbonate electrolyte. The matrix typically comprises a porous, unsintered lithium aluminate ($LiAlO_2$) ceramic powder and is impregnated with carbonate electrolyte, and during operation, the matrix provides ionic conduction and gas sealing.

During MCFC operation, the matrix is subject to both mechanical and thermal stresses which may cause defects or breaks in the matrix. In order to provide effective gas sealing, the matrix must have sufficient strength, mechanical integrity and material endurance to withstand operational stresses, particularly during thermal cycles. In particular, the matrix has to be able to sufficiently accommodate volume changes associated with carbonate melting and solidification during MCFC thermal cycling, provide resistance to pressure differences across the matrix, and provide wet seal holding pressure over long periods of time. It is desired for the matrix to have sufficient porosity and sub-micron pore distribution to maintain strong capillary forces to retain carbonate electrolyte within the matrix's pores in order to prevent flooding of the electrodes and drying of the matrix. It is also desired that the matrix have slow or no pore growth over the MCFC's lifetime in order to continue to retain electrolyte therein by capillary forces.

Various methods of manufacturing a porous ceramic matrix having increased strength and improved electrolyte retention characteristics have been proposed. For example, coarse particles, such as aluminum oxide ($Al_2O_3$) particles in the size range of 10-120 μm, have been used in the matrix to improve compressive strength, crack resistance and thermal cycle capability. Moreover, additives, such as aluminum powder and/or carbonate compounds in powder or particulate form, have been used to improve strength and electrolyte retention capillary force. However, the use of aluminum particles in the matrix to improve strength leads to formation of undesired large pores and large core shell structures that reduce electrolyte storage capacity and stability. In particular, the aluminum particles contribute to formation of large pores and large core shell structures of greater than 2 to 6 μm within the matrix after reacting with molten carbonate electrolyte. Formation of such large pores and large core shell structure often occurs at the beginning of life, i.e., with the first 500 hours of operation, and during conditioning. FIGS. 1-2 show Scanning Electron Microscope (SEM) images of examples of large pores and large core shell structures in a conventional electrolyte matrix. Formation of large pores and large core shell structures reduces capillary force within the matrix and accelerates loss of electrolyte.

The effect of addition of aluminum particles and $Li_2CO_3$ on matrix stability and mechanical strength has also been investigated in Lee et al. J. Power Sources 179 (2008) 504-510. Lee et al. report that aluminum particle size affects snap strength of the matrix, with particles ranging from 20 μm to 30 μm providing higher strength compared to smaller particles sized at approximately 3 μm. However, the use of such aluminum particles results in formation of large pores and large core shell structures in the size range of from 10 μm to 50 μm when the aluminum particles and molten carbonate electrolyte react during conditioning and/or beginning operation of the MCFC.

In another investigation, Lee et al. used aluminum acetate, aluminum isopropoxide and aluminum acetylacetate as precursors to improve matrix strength. See Lee et al. J. Power Sources 101 (2002) 90-95. Aluminum acetylacetate was indicated as providing the improved matrix strength, though less strength than the combination of aluminum and $Li_2CO_3$ was obtained. However, all precursors studied in this investigation decompose to form $Al_2O_3$ at temperatures of approximately 400° C., resulting in poor sintering within the matrix and providing weak mechanical properties.

SUMMARY OF THE INVENTION

The present invention provides an improved method of manufacturing a fuel cell matrix having enhanced pore structure stability, reduced fraction of large pores and improved retention of electrolyte. In addition, the present invention provides a method of manufacturing a fuel cell matrix that is cost effective, easily scalable and has a consistent formulation.

In accordance with the principles of the present invention a fuel cell matrix for use in a molten carbonate fuel cell is described, the fuel cell matrix comprising a support material and an additive material formed into a porous body, and an electrolyte material disposed in pores of the porous body, wherein the additive material is in a shape of a flake and has an average thickness of less than 1 μm. The additive material has one or more of: an average length from 5 μm to 40 μm, an average Brunauer-Emmett-Teller (BET) surface area from 1 $m^2/g$ to 6 $m^2/g$ and a leafing value of 70 to 100. In certain embodiments, the additive material is a metal additive material comprising aluminum. The amount of additive material in the matrix is between 3 volume percent and 35 volume percent. In certain illustrative embodiments, the support material comprises lithium aluminum oxide, the additive material comprises aluminum, and the electrolyte material comprises one or more of carbonate electrolyte and carbonate electrolyte precursor.

A fuel cell system comprising one or more fuel cells, each of the fuel cells including an anode electrode, a cathode electrode and the above fuel cell matrix is also described. In addition, methods of making the fuel cell matrix are described. In accordance with the invention, a method of making a fuel cell matrix for use in a molten carbonate fuel cell, comprises: providing a first predetermined amount of a support material, a second predetermined amount of an electrolyte material and a third predetermined amount of an additive material, processing said support material, electrolyte material and additive material to form the fuel cell matrix including a porous body formed from the support material and the additive material and the electrolyte material disposed in pores of the porous body, wherein the additive material is in a shape of a flake and has an average thickness of less than 1 μm. In certain embodiments, the processing step comprises mixing the first predetermined amount of support material and the second predetermined amount of the electrolyte material to form a first mixture and adding the third predetermined amount of the additive material to the first mixture to form a second mixture. The processing step further comprises adding at least one of a binder and a plasticizer to the second mixture to form a third mixture and forming the fuel cell matrix from the third mixture. In some embodiments, the additive material is pre-milled prior to being added to the first mixture.

In certain embodiments, the method of making a fuel cell matrix for use in a molten carbonate fuel cell, comprising: providing a first predetermined amount of a support material, a second predetermined amount of an electrolyte material and a third predetermined amount of an additive particle material, processing a mixture of the support material, the electrolyte material and the additive particle material to convert the additive particle material into an additive flake material having a shape of a flake and an average thickness of less than 1 μm and to form the fuel cell matrix including a porous body formed from the support material and the additive flake material and the electrolyte material disposed in the pores of the porous body. In some illustrative embodiments, the processing step comprises: mixing the support material and the electrolyte material to form a first mixture, adding the additive particle material to the first mixture to form a second mixture, and milling the second mixture until the additive particle material is converted to the additive flake material. The processing step further comprises adding at least one of a binder and a plasticizer to the second mixture to form a third mixture and forming the fuel cell matrix from the third mixture.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
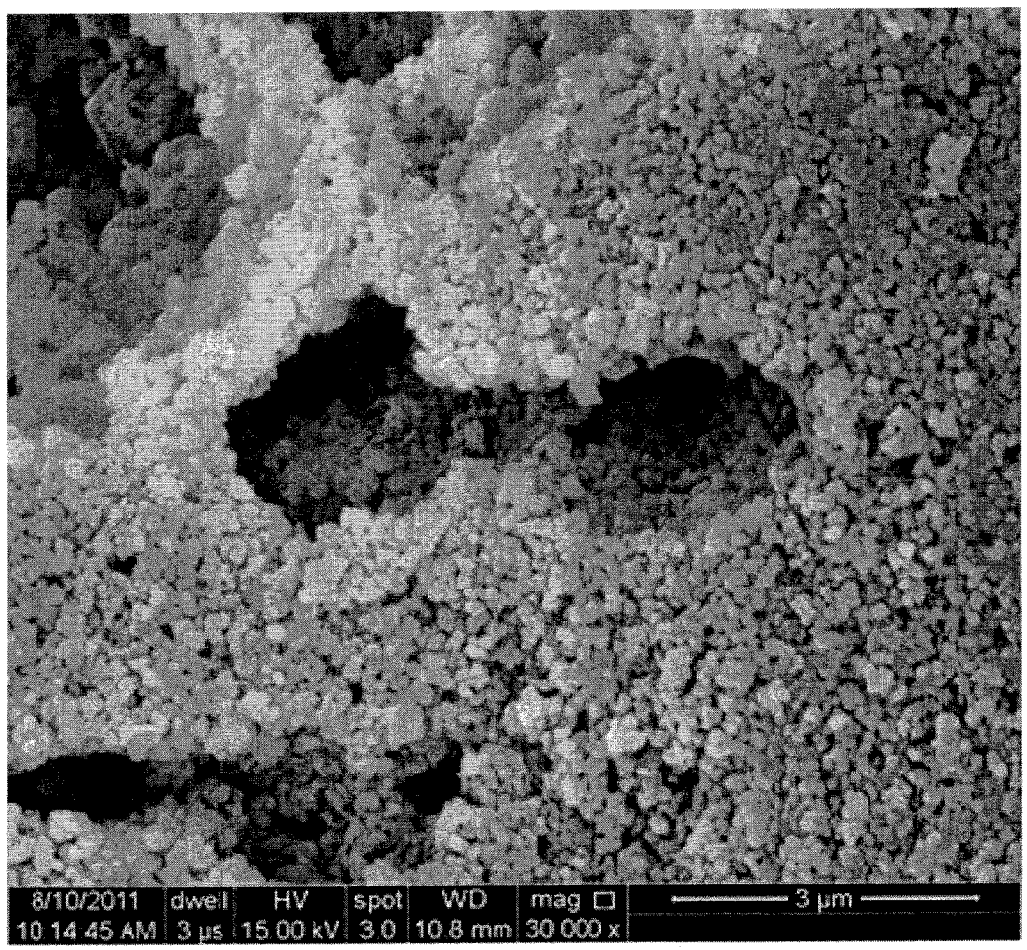
FIGS. 1-2 show Scanning Electron Microscope (SEM) images of examples of large pores and large core shell structures from a conventional electrolyte matrix.
Figure 2:
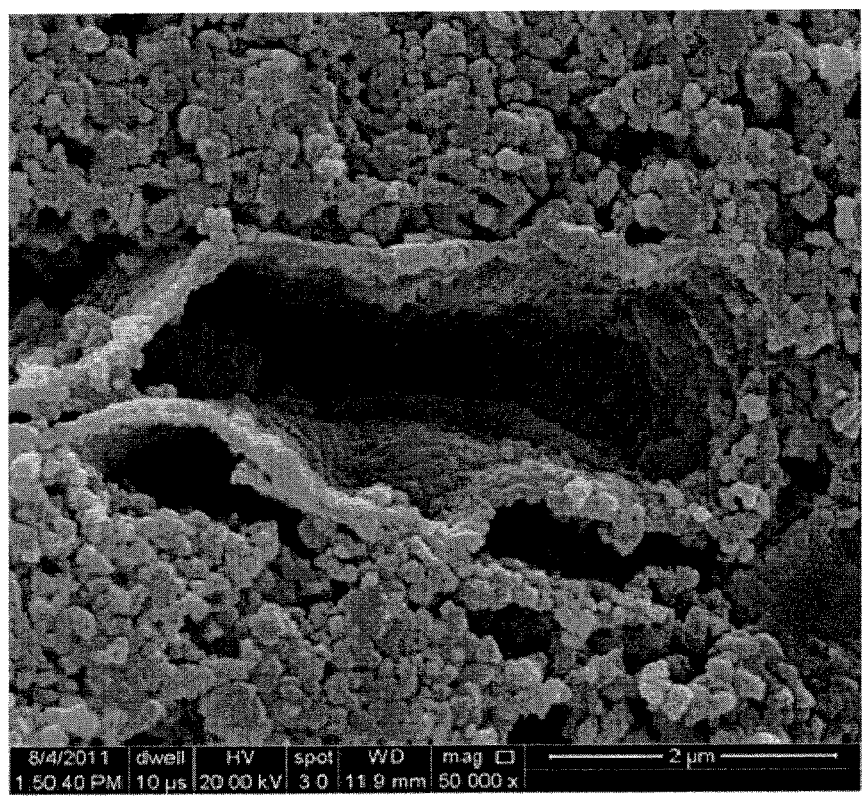
Figure 3:
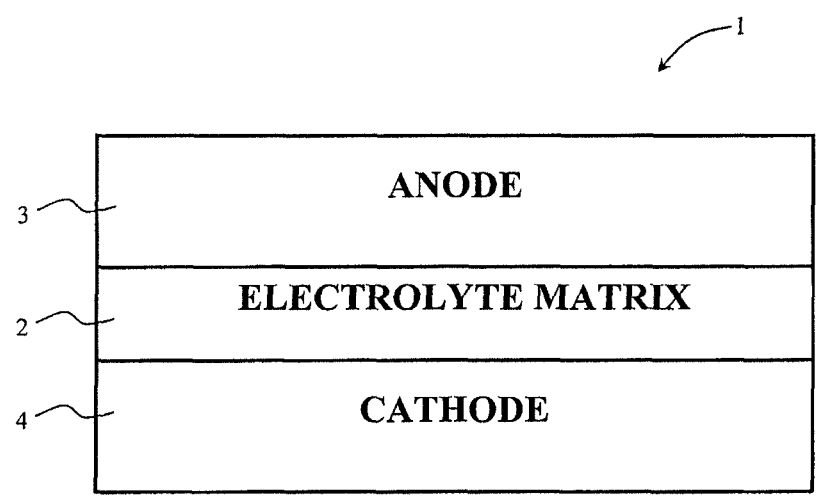
FIG. 3 shows a schematic structure of a molten carbonate fuel cell including an electrolyte matrix.

FIG. 3 schematically shows a Molten Carbonate Fuel Cell ("MCFC") 1 including an electrolyte matrix 2 (hereinafter, "fuel cell matrix" or "matrix") of the present invention. The fuel cell 1 also includes an anode 3 and a cathode 4 which are separated from one another by the matrix 2. Fuel gas is fed to the anode 3 and oxidant gas is fed to the cathode 4. In the fuel cell 1, fuel gas and oxidant gas undergo an electrochemical reaction in the presence of a carbonate electrolyte present in the pores of the electrolyte matrix 2. In typical fuel cell assemblies, individual fuel cells 1 are stacked to form a stack and are connected in series so as to produce sufficient amount of power.

In accord with the present invention, the matrix 2 comprises, and is formed from, a support material, such as lithium aluminum oxide ($LiAlO_2$), electrolyte material such as a carbonate electrolyte or a carbonate electrolyte precursor, and a metal additive material such as aluminum. The metal additive material has flake form such that an average particle size or length of the additive material flakes ranges from 5 μm and 40 μm, and is preferably 12-20 μm, and the an average thickness of the flakes is less than 1 μm, and preferably less than 0.5 μm in order to avoid formation of large voids or pores when the aluminum reacts with the electrolyte. The thickness of the additive material flakes is a key parameter in order to prevent or eliminate large pores formed after the additive material reacts with the electrolyte material during conditioning or operation of the fuel cell. Thinner additive material flakes with a thickness of 0.1 μm to 0.3 μm are desired to effectively eliminate the formation of undesired large pores. The amount of the metal additive material in the matrix is between 3 vol % and 35 vol %. For optimal pore structure, the average BET surface area of the additive material is between 1 $m^2/g$ and 6 $m^2/g$. When forming the matrix from the support material, electrolyte material and additive material, the additive material flakes may have a coating thereon, such as a stearic acid coating, in order to prevent re-agglomeration of the flakes and to eliminate any handling concerns.

Although $LiAlO_2$ can be used as the support material in the matrix, other stable support materials in the molten carbonate electrolyte may be used in the support material. The electrolyte material comprises carbonate electrolyte, including one or more of $Li_2CO_3$, $Na_2CO_3$ and $K_2CO_3$. Alkaline precursors that form carbonate materials during conditioning and/or operation of the fuel cell may also be used as the electrolyte materials in the matrix. The metal additive material can be an aluminum flake material. It is understood that other materials may be suitable for use in the fuel cell matrix 2 of the fuel cell 1.

Figure 4:
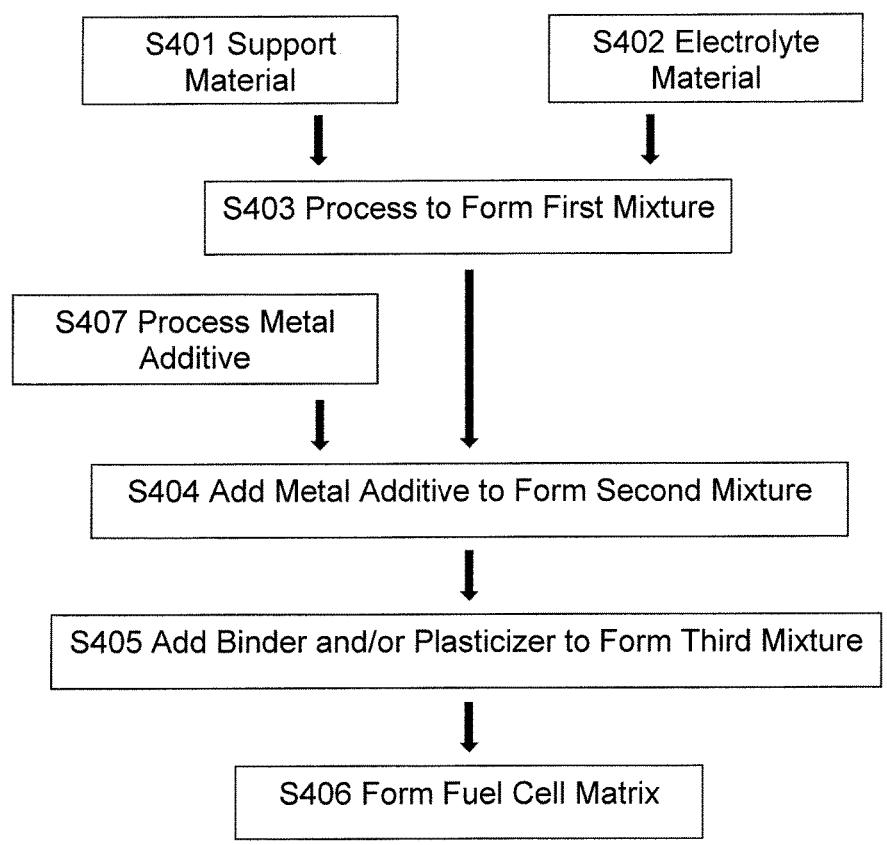
FIG. 4 shows a flow diagram of a method for making a fuel cell matrix for use in manufacturing the molten carbonate fuel cell.

FIG. 4 shows a flow diagram of a method for making a fuel cell matrix for use in the molten carbonate fuel cell 1. As shown in FIG. 4, in a first step S401, a first predetermined amount of a support material is provided and in a second step S402, a second predetermined amount of an electrolyte material is provided. As mentioned herein, $LiAlO_2$, including $\gamma$-$LiAlO_2$, and $\alpha$-$LiAlO_2$, is suitable for use as the support material. Suitable electrolyte materials in this illustrative embodiment include lithium carbonate, potassium carbonate and sodium carbonate, and more specifically, eutectic or off-eutectic mixtures of these carbonate materials. As mentioned herein above, precursor materials that form carbonate electrolyte may be used as the electrolyte material. The second predetermined amount of the electrolyte material is relative to the first predetermined amount of the support material. In particular, the second predetermined amount of the electrolyte material, provided in step S402, is between 5 and 100 volume percent of the first predetermined volume amount of the support material. The support material and/or the electrolyte material may be pre-milled to achieve a desired particle size. Suitable particle size of the support material is from 0.005 µm to 0.5 µm and suitable particle size of the electrolyte material is from 0.01 µm to 0.5 µm.

In a third step S403, the support material provided in step S401 and the electrolyte material provided in step S402 are processed to form a first mixture by milling or mixing these materials in an appropriate solvent. The solvent may comprise a predetermined percentage of fish oil or other oil to prevent re-agglomeration of particles. Processing continues for a predetermined amount of time until a desired size is achieved. Conventional methods, such as dry blending in a blender, may be employed in the third step S403.

In a fourth step S404, a third predetermined amount of the metal additive material is added to the processed first mixture to form a second mixture. In particular, the third predetermined amount of the metal additive material comprises from about 3 volume percent to 35 volume percent of the fuel cell matrix, and according to some embodiments, from 10 volume percent to 25 volume percent (or 6-12 wt %). As discussed above, the metal additive is in a flake form with an average length of from 5 µm to 40 µm, and in some illustrative embodiments having an average length of 12 µm to 20 µm, and in further illustrative embodiments, having an average length from 15 µm to 18 µm. As discussed above, the metal additive material flakes have an average thickness of less than 1 µm, and in some embodiments, less than 0.5 µm, and in further embodiments from 0.1 µm to 0.3 µm. The metal additive material may comprise an average Brunauer-Emmett-Teller (BET) surface area of from 1 $m^2$/g to 6 $m^2$/g. Further, the metal additive may comprise a leafing value of from 70 to 100%.

Using the metal additive material flakes with the above described characteristics mitigates formation of large pores and large core shell structures in the fuel cell matrix after the additive material reacts with the electrolyte precursor material, and provides an optimal pore structure, enhancing strength of the fuel cell matrix and improving life resistance stability by over 40 percent.

According to an illustrative embodiment, the metal additive comprises a coating of an acidic compound that prevents re-agglomeration. In particular, the acidic compound comprises stearic acid or another acid suitable for such use.

In a fifth step S405, a fourth predetermined amount of at least one of a binder and a plasticizer are added to the second mixture to form a third mixture. The binder may be an acryloid binder and the plasticizer may be a Santicizer® 160 plasticizer. Other suitable materials may be used in the third mixture to form the desired consistency of the mixture.

In a sixth step S406, the third mixture is tape casted to form the fuel cell matrix. The tape casted fuel cell matrix is dried at a predetermined temperature for a predetermined amount of time, after which sheets of the fuel cell matrix are ready for use. Although tape casting is used to form the fuel cell matrix, other suitable methods may be used instead of tape casting.

In some illustrative embodiments, the metal additive material is processed ex-situ in step S407, which occurs prior to the fourth step S404, i.e., prior to adding the additive material to the first mixture. The metal additive material is processed, i.e., milled, for a predetermined amount of time to achieve desired flake dimensions using grinding media of a predetermined size at a predetermined speed. In some embodiments, the metal additive material is milled using YTZ® grinding media or other suitable grinding media having a ball size of 0.3 mm to 0.6 mm at the predetermined speed is from 2,000 Revolutions Per Minute (RPM) to 3,000 RPM, for the predetermined amount of time of 120 minutes to 300 minutes. The processed metal additive material flake has an average length from 5 µm to 40 µm with an average thickness from 0.1 µm to 1.0 µm.

Figure 5:
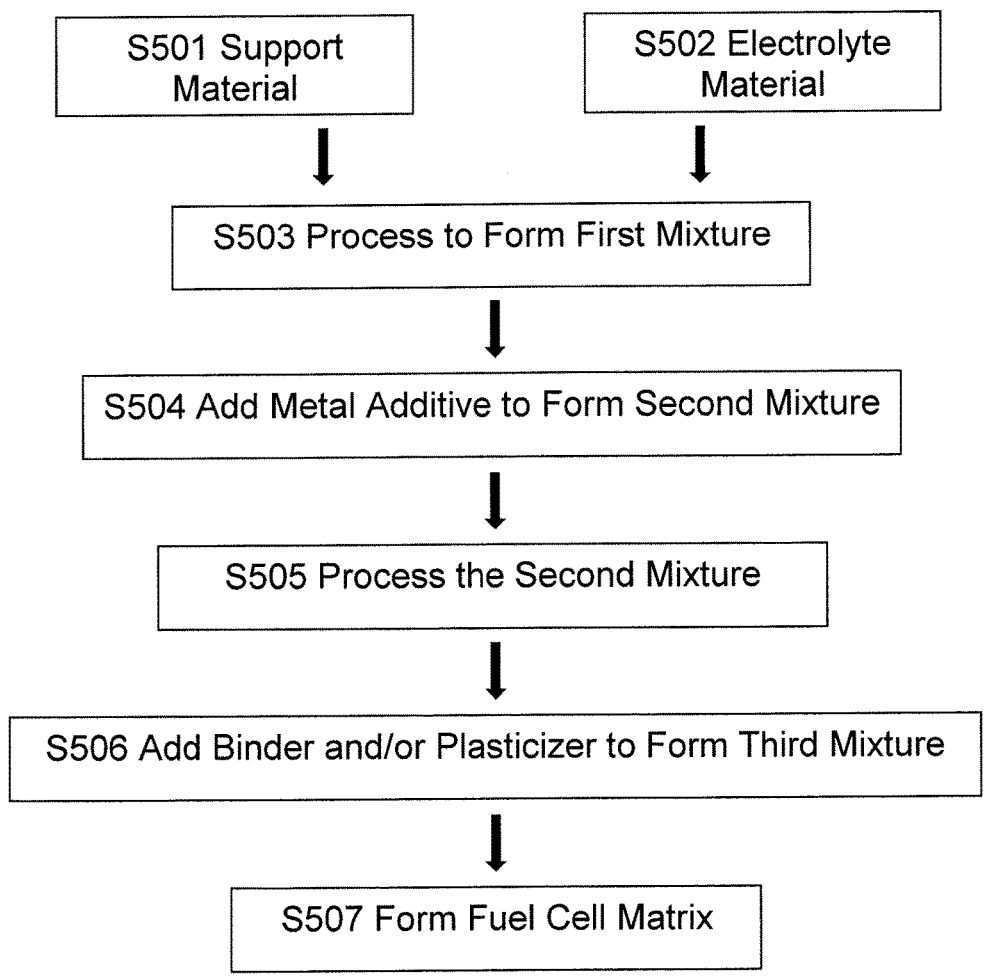
FIG. 5 shows a flow diagram of another method for making a fuel cell matrix for use in manufacturing of the molten carbonate fuel cell.

FIG. 5 shows a flow diagram of another method for making a fuel cell matrix for use in the molten carbonate fuel cell 1. As shown in FIG. 5, in a first step S501, a first predetermined amount of a support material is provided and in a second step S502, a second predetermined amount of an electrolyte material is provided. Suitable support materials and electrolyte materials are described herein above. As in the method of FIG. 4, the second predetermined amount of the electrolyte material is relative to the first predetermined amount of the support material. In particular, the second predetermined amount of the electrolyte material, provided in step S502, is between 5 and 100 volume percent of the first predetermined volume amount of the support material. The support material and the electrolyte material may be pre-milled to achieve a desired particle size.

In a third step S503, the support material provided in step S501 and the electrolyte material provided in step S502 are processed to form a first mixture by milling or mixing in an appropriate solvent. The solvent may comprise a predetermined amount of fish oil or other oil to prevent re-agglomeration of particles. Processing continues for a predetermined amount of time until a desired size is achieved. The processing in step S503 is similar to the processing performed in step S403 in the method of FIG. 4 described above. Moreover, other mixing or milling methods, such as dry blending in a blender, may be employed in the third step S503.

In a fourth step S504, a third predetermined amount of a metal additive particulate material is added to the processed first mixture to form a second mixture. In particular, the third predetermined amount of the metal additive particulate material is from about 5 volume percent to 35 volume percent of the fuel cell matrix. The metal additive particulate material is in the form of rounded particles and has an average particle size of 5 to 7 µm.

In a fifth step S505, the second mixture is in-situ processed until the metal additive particles exhibit properties of a flake, i.e., the metal additive particulate material is physically converted to the metal additive material having the above-described flake form. In particular, the second mixture is processed by milling or blending to flatten the metal additive particles into flakes. The second mixture is processed, i.e., milled, for a predetermined amount of time to achieve desired flake dimensions of the metal additive material using grinding media of a predetermined size at a predetermined speed. In some illustrative embodiments, the predetermined amount of time is 120 minutes to 300 minutes, the predetermined size of the grinding media, e.g. YTZ® grinding media, is from 0.3 mm to 0.6 mm and the predetermined speed is from 2,000 RPM to 3,000 RPM. The processed metal additive material has a flake size with an average length of from 5 µm to 40 µm and an average thickness from 0.1 µm to 1.0 µm.

In a sixth step S506, a fourth predetermined amount of at least one of a binder and a plasticizer is added to the second mixture to form a third mixture. The binder and/or plasticizer are the same or similar to those used in the method of FIG. 4. Moreover, other suitable materials may be used to achieve a desired consistency of the mixture.

In a seventh step S507, the third mixture is tape cast to form the fuel cell matrix. The tape casted fuel cell matrix is dried at a predetermined temperature for a predetermined amount of time, after which sheets of the fuel cell matrix are ready for use. As mentioned above, other suitable methods may be used for forming the fuel cell matrix from the third mixture.

The optimal components and amounts of those components used to manufacture the fuel cell matrix using the above-described methods are dependent on the particular application and requirements of the molten carbonate fuel cell. Illustrative examples of methods of making the fuel cell matrix and compositions made from the methods are described herein below.

Example 1

In this illustrative example, the method shown in FIG. 4, and described above, is used to prepare the fuel cell matrix.

In the first step S401, a first predetermined amount of the support material is provided and in the second step S402, a second predetermined amount of the electrolyte material is provided. In this illustrative example, the support material comprises $LiAlO_2$ and the electrolyte material comprises $Li_2CO_3$. The first predetermined amount of $LiAlO_2$ is 150 grams (g), and the second predetermined amount of $Li_2CO_3$ is 69.3 g.

In the third step S403, the support material and the electrolyte precursor material are combined with a solvent, such as Methyl-Ethyl-Ketone (MEK), to form a first mixture. In particular, the solvent includes from 1 volume percent to 6 volume percent fish oil, which prevents re-agglomeration of particles in the mixture. In this illustrative example, the first mixture is processed according an attrition milling technique using Yttria-stabilized Zirconia (YTZ) grinding media having a ball size of from 0.3 mm to 3 mm. Grinding media loading is from 60 percent to 80 percent and grinding speed is from 2,000 RPM to 3,000 RPM.

After processing the first mixture to an appropriate size, in the fourth step S404, a third predetermined amount of a metal additive material having a flake form is added to the processed first mixture to form a second mixture. In particular, the metal additive material comprises an aluminum additive, such as Compound (A) or Compound (B), and the third predetermined amount is approximately from about 3 volume percent to 35 volume percent. In this illustrative example, the third predetermined amount is between about 3 volume percent and 5 volume percent (5 weight percent to 8 weight percent), of total mixture including the support material, the electrolyte material and the metal additive material. In this example, the aluminum additive material comprises aluminum flakes having the form described above.

In this illustrative example, the aluminum additive material is formed from one of Compounds (A) and (B) indicated in Tables 1 and 2, respectively:

TABLE 1

| Compound (A) | | |
|---|---|---|
| PROPERTIES | VALUE | UNIT |
| Particle Size Distribution D 50 (approx.) | 16 | µm |
| Passing 45 µm | 99 | % |
| Non-Volatile Content | 75.8 | % |
| Volatile Content | 24.2 | % |
| Spatula Leafing (Leafing Value) | 65-100 | % |

TABLE 2

| Compound (B) | | |
|---|---|---|
| PROPERTIES | VALUE | UNIT |
| Particle Size Distribution D 50 (approx.) | 17.5 | µm |
| Passing 45 µm | 98.5-100 | % |
| Leafing Value | 70-100 | % |

In the fifth step S405, a fourth predetermined amount of at least one of a binder and a plasticizer are added to the second mixture to form a third mixture. In particular, the binder and the plasticizer may comprise an acryloid binder and a polar polymer plasticizer, such as Sancticizer® 160, respectively. In this illustrative example, the fourth predetermined amount comprises about 19 to 20 weight percent of the total weight of the fuel cell matrix.

In the sixth step S406, forming the fuel cell matrix comprises tape casting the third mixture and drying the cast third mixture at a predetermined temperature, such as 60° C., for a predetermined amount of time, such as from 20 to 40 minutes. After drying, the fuel cell matrix, in the form of a green tape element, is ready for use and testing.

Figure 6:
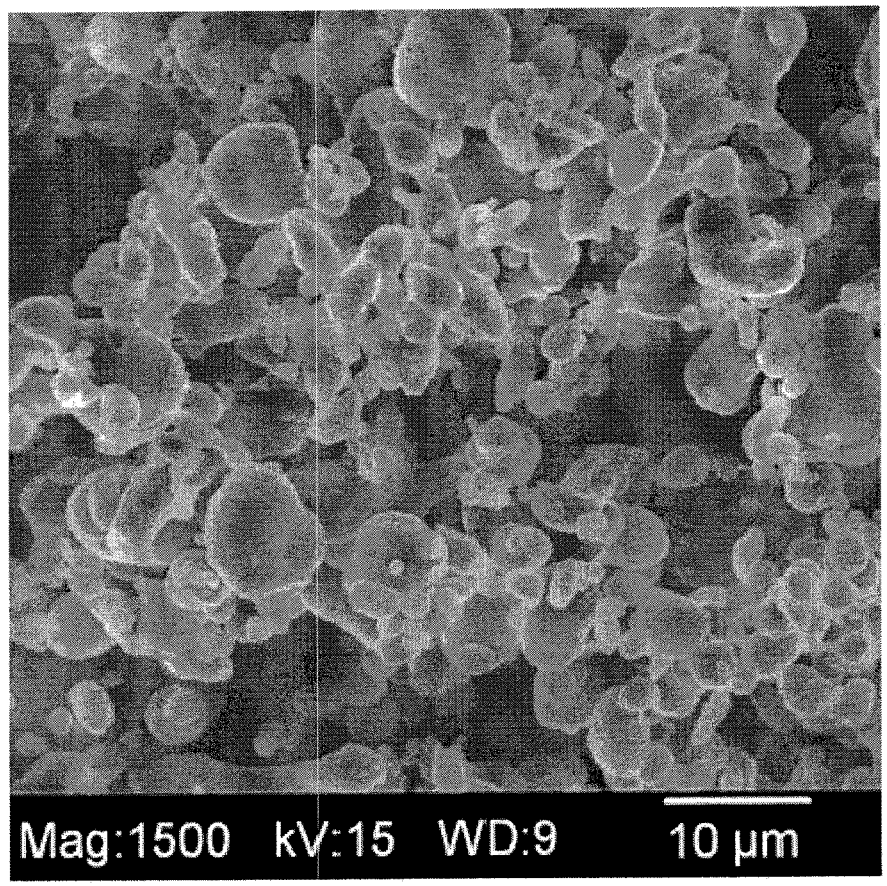
FIG. 6 shows an SEM image of aluminum particles used to manufacture a conventional fuel cell matrix.

FIG. 6 shows an SEM image of aluminum particles used to manufacture a conventional fuel cell matrix. In particular, FIG. 6 shows that the aluminum particles form large pores and large core shell structures.

Figure 7:
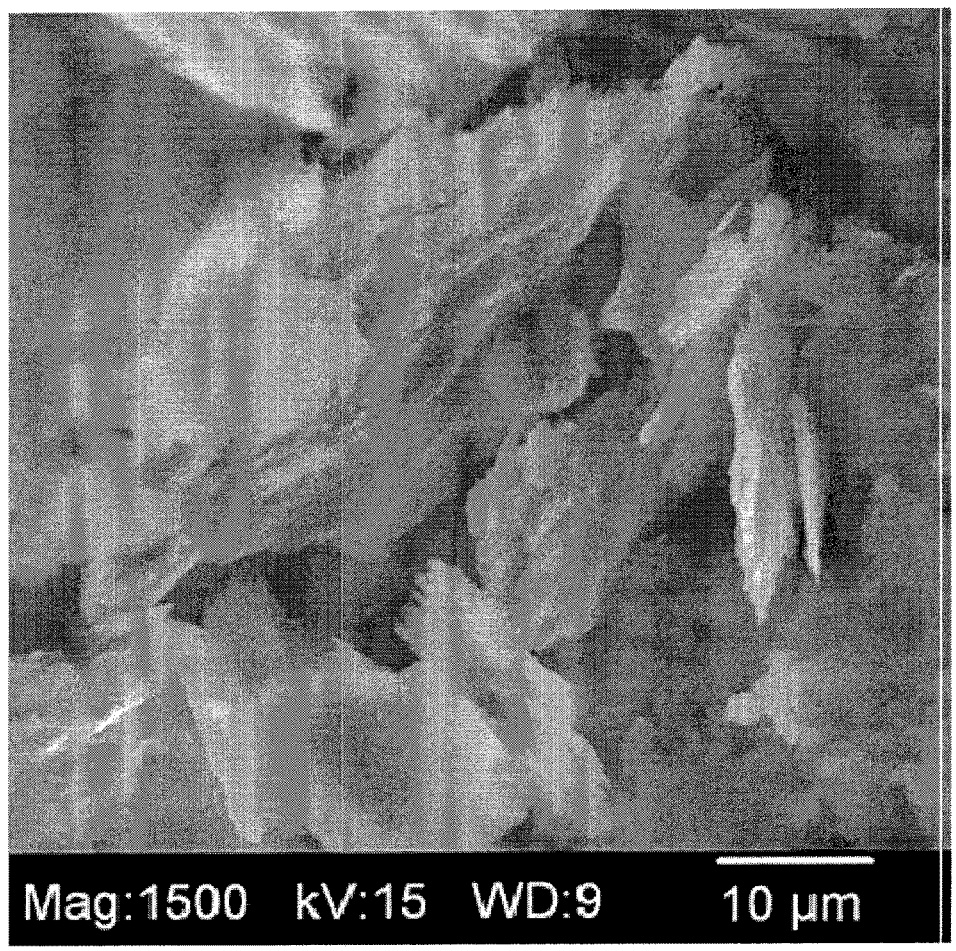
FIG. 7 shows an SEM image of aluminum flakes used to manufacture a fuel cell matrix according to the methods described herein.

FIG. 7 shows an SEM image of aluminum flakes used to manufacture a fuel cell matrix according to the methods described herein. In particular, the aluminum flakes in FIG. 7 have an average length of 5 µm to 40 µm, and in some embodiments an average length of 12 µm to 20 µm, and in further embodiments, an average length of 15 µm to 18 µm; and an average thickness of the flakes is less than 1 µm, and in some embodiments, less than 0.5 µm, and in further embodiments between 0.1 µm and 0.3 µm. Additional properties of the aluminum flakes comprise an average BET surface area from 1 $m^2/g$ to 6 $m^2/g$; and a leafing value of from 70 percent to 100 percent (%).

Figure 8:
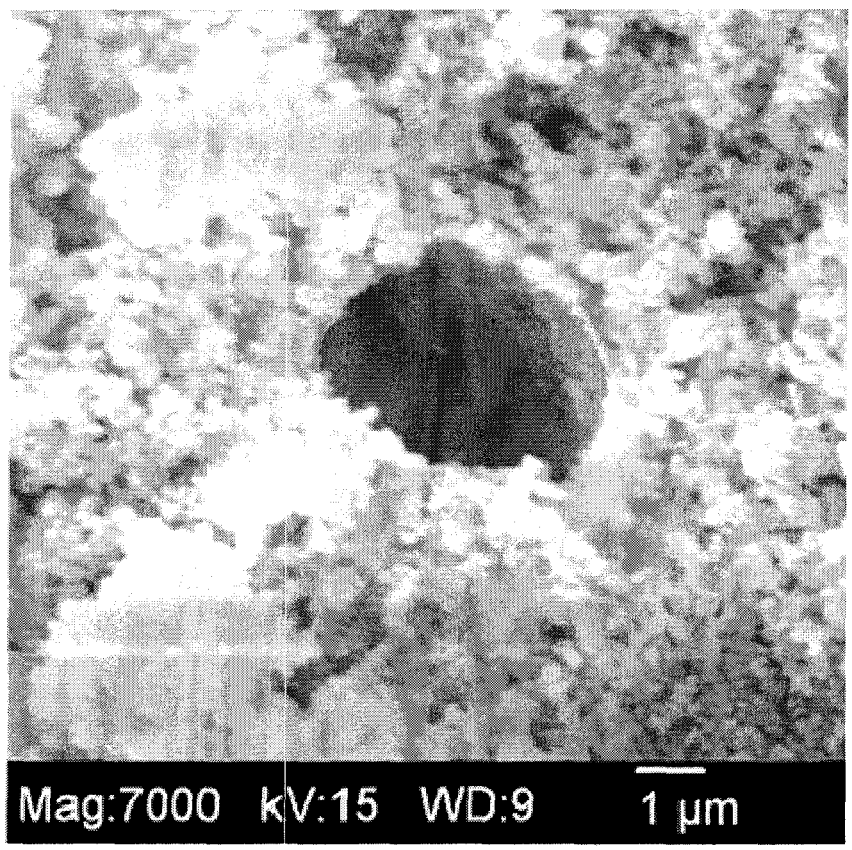
FIGS. 8-9 show SEM images of burnout fuel cell matrix samples made using conventional aluminum particles.
Figure 9:
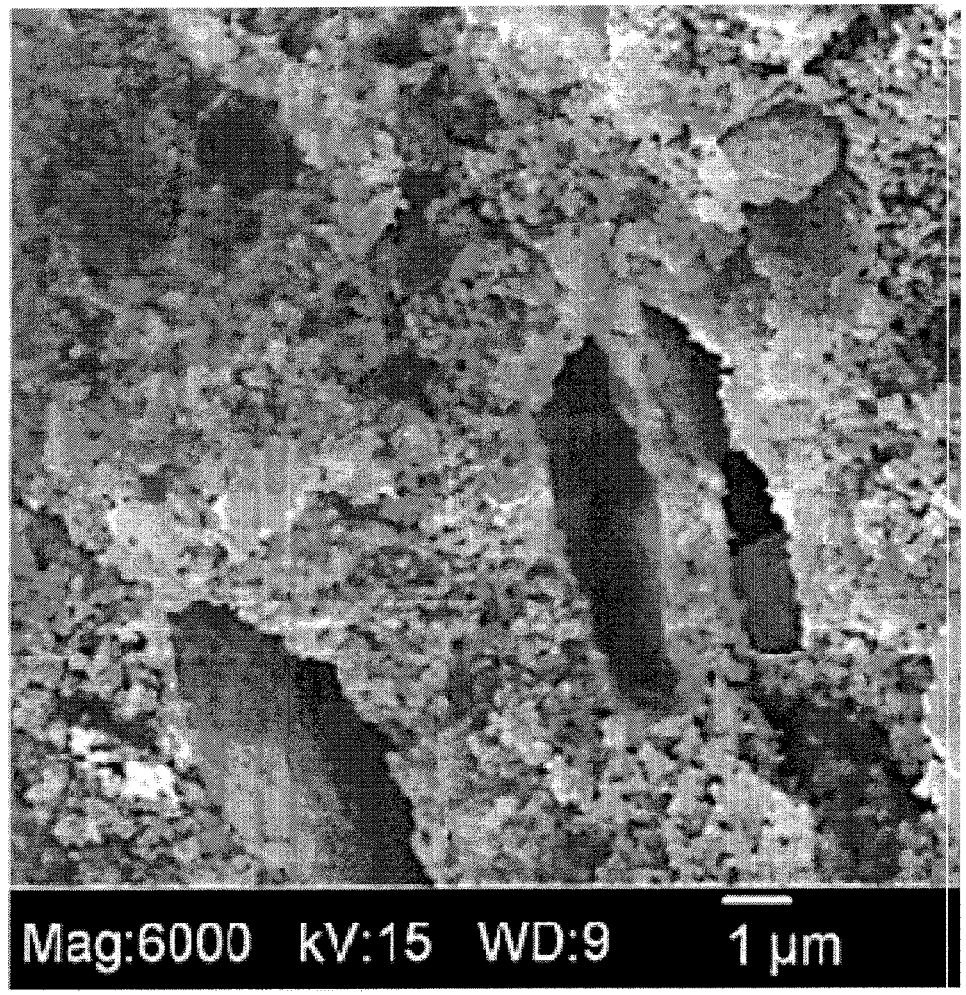
Figure 10:
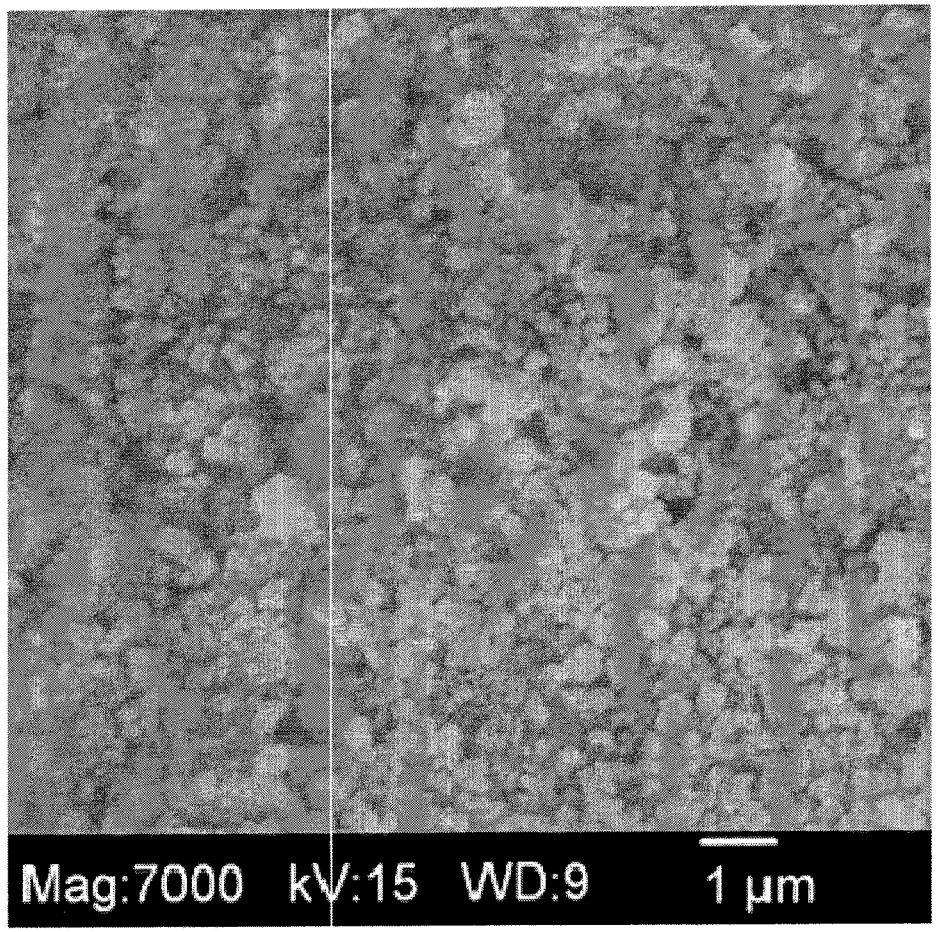
FIGS. 10-11 show SEM images of burnout fuel cell matrix samples made using aluminum flakes.
Figure 11:
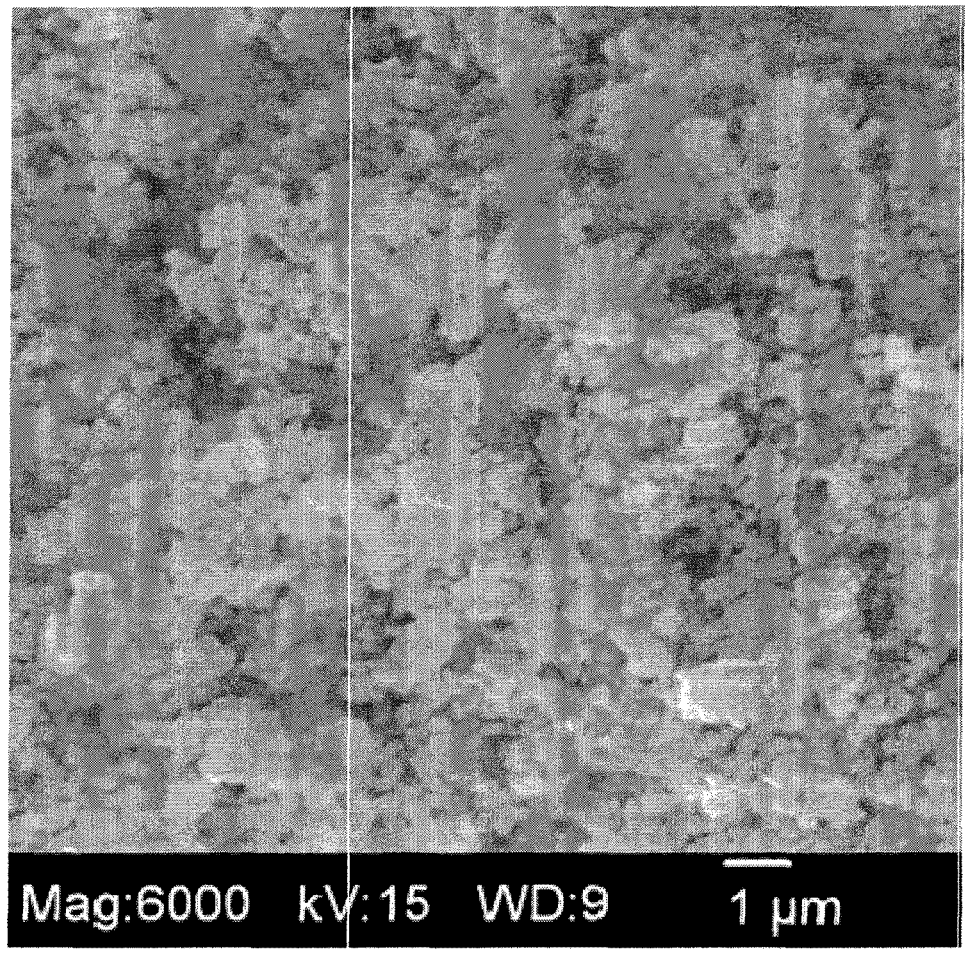

FIGS. 8-9 show SEM images of burnout fuel cell matrix samples made using conventional aluminum particles. FIGS. 10-11 illustrate SEM images of burnout fuel cell matrix samples made using aluminum flakes. Extended burnout tests were performed on the fuel cell matrix samples at 650° C. for 150 hours to compare a conventional fuel cell matrix made using conventional aluminum particles and the fuel cell matrix made according to the methods described herein. FIGS. 8-9 show that the fuel cell matrix samples made with conventional aluminum particles exhibit large pores and large core shell structures. FIGS. 10-11 show that the fuel cell matrix samples made with aluminum flakes exhibit a reduction of the length and a reduction or elimination of large pores and large core shell structures.

Figure 12:
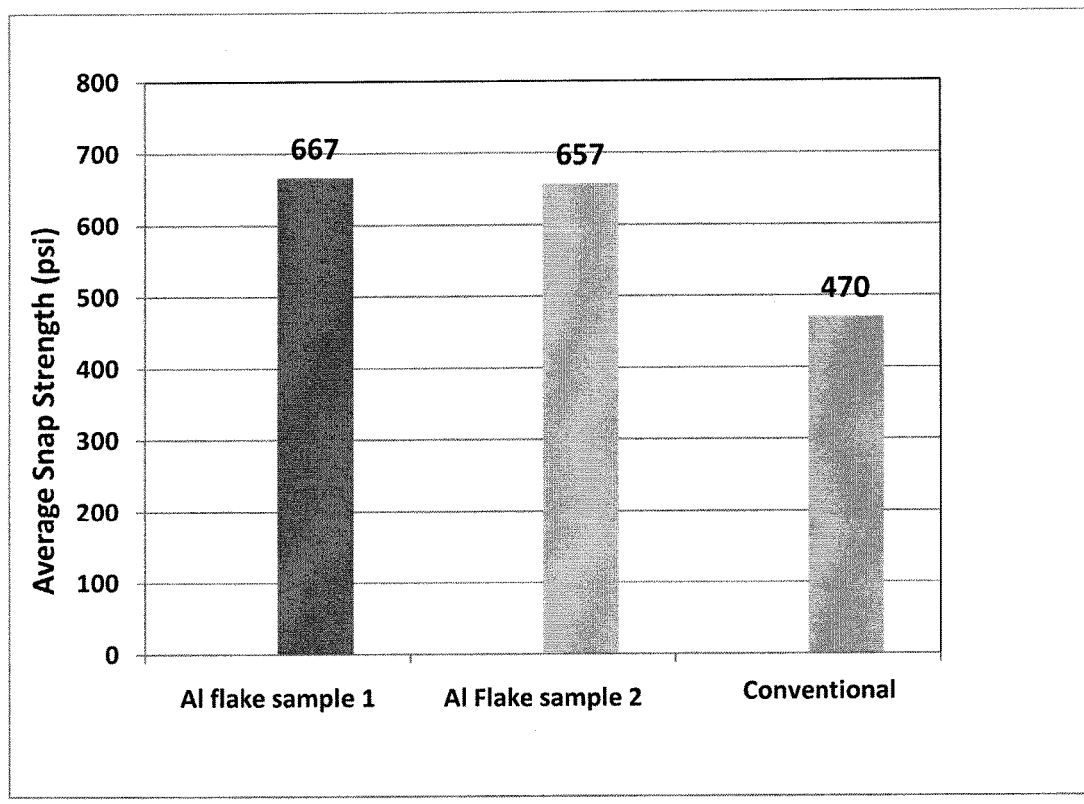
FIG. 12 shows a graph comparing average snap strengths of two aluminum flake fuel cell matrix samples made according to the methods described herein to a fuel cell matrix made using conventional aluminum particles.

FIG. 12 shows a graph comparing average snap strength of two aluminum flake fuel cell matrix samples made according to the methods described herein to the average snap strength of a fuel cell matrix made using conventional aluminum particles. Samples were prepared for snap strength testing by heating the fuel cell matrix samples at approximately 500° C. for 2 hours. Average snap strength data presented in FIG. 12 were determined using three-point bending testing. As shown in FIG. 12, fuel cell matrix samples made with aluminum flakes using the methods of the present invention exhibited a snap strength of 667 Pounds per Square Inch (PSI) and 657 PSI, while a conventional fuel cell matrix made with conventional aluminum particles exhibited a snap strength of 470 PSI. This improvement in snap strength is due to the reduction and/or elimination of large pores and large core shell structures in the fuel cell matrix.

Molten Carbonate Fuel Cell Test:

A bench-scale MCFC was prepared as described above and tested to determine performance and stability of the fuel cell matrix made according to the methods described herein compared to a conventional fuel cell matrix. The MCFC assembly tested comprised an anode, such as a nickel-aluminum anode, a nickel-chromium anode and/or a nickel-aluminum chromium anode, and a cathode, such as a porous in-situ oxidized and lithiated nickel-oxide cathode. The anode and the cathode were separated by a porous ceramic fuel cell matrix, which, in separate tests, was a conventional fuel cell matrix and a fuel cell matrix made according to the methods described herein. The cathode was filled with an appropriate amount of $Li_2CO_3/K_2CO_3$ or $Li_2CO_3/Na_2CO_3$ electrolyte and an appropriate amount of $Li_2CO_3/K_2CO_3$ or $Li_2CO_3/Na_2CO_3$ electrolyte was also stored in a cathode current collector to ensure electrolyte balance.

During testing, anode gas comprised a composition of 72.8 percent $H_2$, 18.2 percent $CO_2$, and 9 percent $H_2O$, and cathode gas comprised a composition of 18.5 percent $CO_2$, 12.1 percent $O_2$, 66.4 percent $N_2$, and 3 percent $H_2O$. Tests were performed under accelerated conditions with operating temperatures of 665° C., fuel utilization of 80 percent and steam content of 20 percent. Tests were performed at 160 mA/cm$^2$ and 80 percent utilization in the anode and cathode. Cell resistance, voltage and gas cross-over stability were monitored to evaluate performance and stability of each fuel cell matrix.

Figure 13:
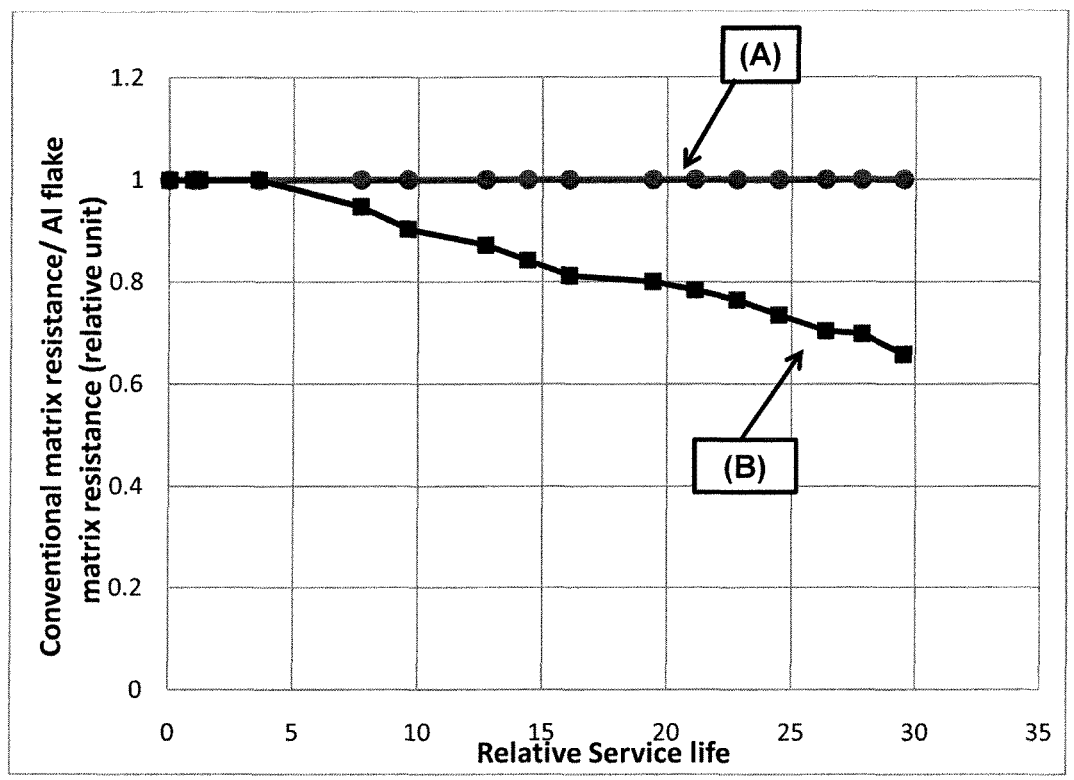
FIG. 13 shows a graph comparing a ratio of conventional matrix resistance to aluminum flake matrix resistance versus relative service life of the fuel cell matrix made according to the methods described herein and of the conventional fuel cell matrix made of conventional aluminum particles.

FIG. 13 shows a graph comparing resistance stability of a conventional matrix (line (A)) to resistance stability of the fuel cell matrix with aluminum flake additive material in accordance with the present invention (line (B)). In FIG. 13, the X-axis represents the relative service life (in relative units of time of the fuel cell matrix while the Y-axis represents the resistance stability (in relative units) of the matrix. As can be seen in FIG. 13, the fuel cell matrix made with aluminum flakes in accord with the invention demonstrates greater than 40 percent improved resistance stability when compared with the resistance stability of the conventional fuel cell matrix. The improvement is due to fewer large pores in the fuel cell matrix of the present invention and its more stable pore structure. Aluminum flakes utilized as the additive material in the methods described herein reduce formation of large pores and large core shell structures in the resulting fuel cell matrices, maintaining stable capillary force and electrolyte retention.

Figure 14:
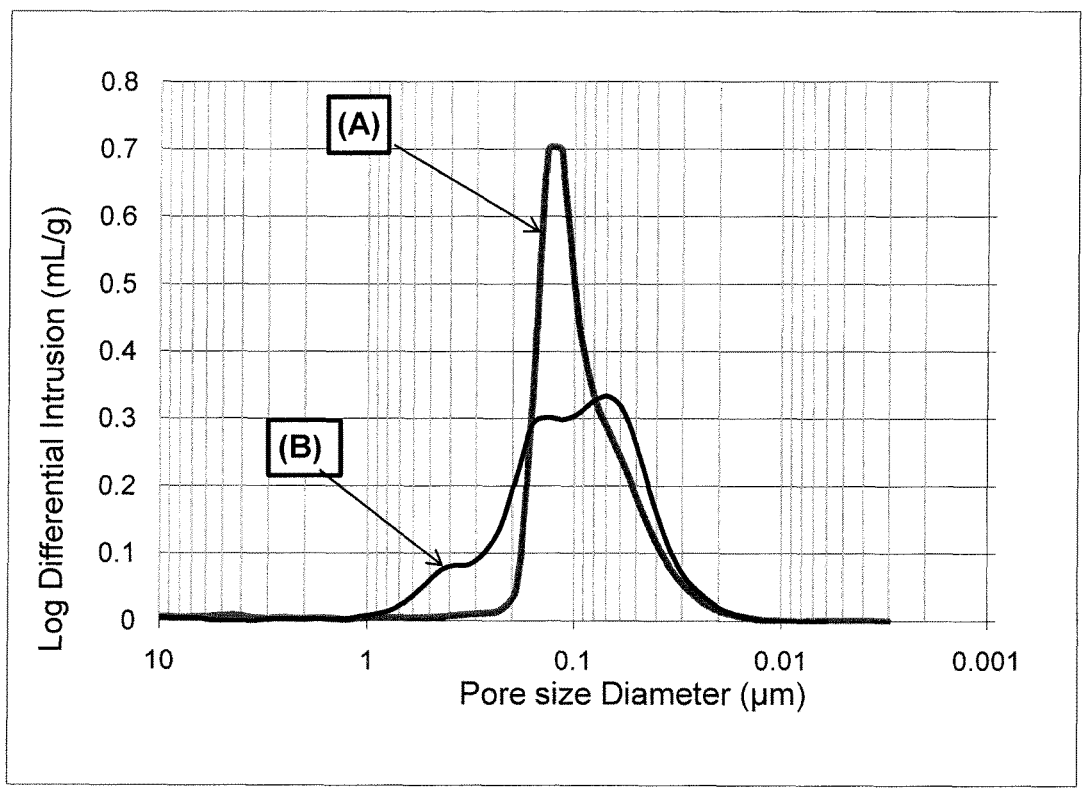
FIG. 14 shows a graph comparing pore diameter versus log differential intrusion of a fuel cell matrix made according to methods described herein and of a conventional fuel cell matrix.

FIG. 14 shows a graph comparing pore diameter (μm) versus log differential intrusion (mL/g) of a fuel cell matrix made according to methods described herein (line (A)) and a conventional fuel cell matrix (line (B)) at the end of life. The testing of the matrix samples was conducted under conditions of 160 mA/cm$^2$ current density and 75 percent fuel utilization. FIG. 14 shows that the fuel matrix made according to methods described herein demonstrates fewer large pores and fewer large core shell structures than the conventional fuel cell matrix, providing a greater than 40 percent reduction in large pores, confirming the improvement of the fuel cell matrix made according to the methods described herein using aluminum flakes over the conventional fuel cell matrix.

Example 2

In this illustrative example, the method shown in FIG. 5, and described above, is used to prepare the fuel cell matrix.

In the first step S501, a first predetermined amount of the support material is provided and in the second step S502, a second predetermined amount of the electrolyte material is provided. In this illustrative example, the support material comprises $LiAlO_2$ and the electrolyte material comprises $Li_2CO_3$. The first predetermined amount of the support material is 150 g, and the second predetermined amount of electrolyte material is 69.3 g. In the third step S503, the support material and the electrolyte material are combined with a solvent, such as MEK, to form a first mixture. In particular, the solvent includes from 1 volume percent to 6 percent by volume of fish oil, which prevents re-agglomeration of particles. In this illustrative example, the first mixture is processed using an attrition milling technique using Yttria-stabilized Zirconia (YTZ) grinding media having a ball size of from 0.3 mm to 3 mm. Grinding media loading is from 60 percent to 80 percent and grinding speed is from 2,000 RPM to 3,000 RPM.

After processing the first mixture to an appropriate size, in the fourth step S504, a third predetermined amount of a metal additive particulate material is added to the processed first mixture to form a second mixture. In particular, the metal additive particulate material comprises an aluminum particulate material, such as A1-100 rounded aluminum powder (Compound (C)), having generally rounded aluminum particles, and the third predetermined amount is approximately from about 3 volume percent to 35 volume percent of the total second mixture, and in some embodiments the third predetermined amount is 10 volume percent to 25 volume percent (6 weight percent to 12 weight percent) of the second mixture that includes the support material, the electrolyte material and the metal additive particulate material.

In this illustrative example, the aluminum particulate additive comprises Compound (C) having properties shown in Table 3:

TABLE 3

| Compound (C) | | |
|---|---|---|
| Properties | Value | Unit |
| Particle size | 1-5 | μm |
| Purity | 99.9 | % |

In the fifth step S505, the second mixture is in-situ processed until the metal additive particulate material is converted to the metal additive material comprising aluminum flakes. The second mixture is processed by milling or blending to flatten the metal additive particles in the metal additive particulate material into flakes. The metal additive is processed, i.e., milled, for a predetermined amount of time to achieve the desired flake dimensions using grinding media of a predetermined size at a predetermined speed. In this illustrative example, the predetermined amount of time comprises 120 minutes to 300 minutes. The predetermined size of the grinding media comprises from 0.3 mm to 0.6 mm and the predetermined speed is from 2,000 RPM to 3,000 RPM. The processed metal additive comprises flakes having an average length from 5 μm to 40 μm with an average thickness from 0.1 μm to 1.0 μm.

In the sixth step S506, a fourth predetermined amount of at least one of a binder and a plasticizer are added to the second mixture to form a third mixture. In particular, the binder and the plasticizer may comprise an acryloid binder and a polar polymer plasticizer, such as Sancticizer® 160 respectively. In this illustrative example, the fourth predetermined amount is about 19 to 20 weight percent of the total weight of the fuel cell matrix.

In the seventh step S507, forming the fuel cell matrix comprises tape casting the third mixture and drying the cast third mixture at a predetermined temperature, such as 60° C., for a predetermined amount of time, such as from 20 to 40 minutes. After drying, the fuel cell matrix, in the form of a green tape element, is ready for use and testing.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

What is claimed is:

1. A green tape cast element for use in forming a fuel cell matrix, the green tape cast element being formed by tape casting a composition comprising:
   a support material comprising lithium aluminum oxide,
   an electrolyte material comprising one or more of carbonate electrolyte and carbonate electrolyte precursor, and
   an additive material consisting essentially of aluminum flakes having an average length in a range of 5 μm to 40 μm and an average thickness of less than 1 μm.

2. The green tape cast element in accordance with claim 1, wherein the flakes of the additive material have an average Brunauer-Emmett-Teller (BET) surface area from 1 $m^2/g$ to 6 $m^2/g$.

3. The green tape cast element in accordance with claim 1, wherein an amount of the additive material in the composition is between 3 volume percent and 35 volume percent.

4. The green tape cast element in accordance with claim 1, wherein the flakes of the additive material have a leafing value of 70 to 100%.

5. The green tape cast element in accordance with claim 1, wherein the plurality of flakes have an average length in a range of 12 μm to 20 μm.

6. The green tape cast element in accordance with claim 1, wherein the plurality of flakes have an average length in a range of 15 μm to 18 μm.

7. The green tape cast element in accordance with claim 1, wherein the plurality of flakes have an average thickness of less than 0.5 μm.

8. The green tape cast element in accordance with claim 1, wherein the plurality of flakes have an average thickness in a range of 0.1 μm to 0.3 μm.

9. The green tape cast element in accordance with claim 1, wherein the flakes are coated with an acidic compound adapted to prevent re-agglomeration.

10. The green tape cast element in accordance with claim 9, wherein the acidic compound is stearic acid.

11. The green tape cast element in accordance with claim 1, further comprising a binder and a plasticizer.

12. A conditioned fuel cell matrix formed by conditioning the green tape cast element of claim 1 such that the additive material reacts with the electrolyte material.

13. The conditioned fuel cell matrix of claim 12, wherein the conditioning is performed by heating the green tape cast element at a temperature of at least 500° C. for at least two hours.

14. The conditioned fuel cell matrix of claim 12, wherein the conditioning is performed by heating the green tape cast element at a temperature in range of 500 to 650° C. for a time in a range of 2 to 150 hours.

15. The conditioned fuel cell matrix of claim 12, wherein the conditioned fuel cell matrix has a snap strength of at least 657 PSI.

16. A fuel cell system comprising one or more fuel cells, each of the fuel cells including an anode electrode, a cathode electrode and a conditioned fuel cell matrix in accordance with claim 12.

* * * * *